United States Patent [19]

Fracalossi et al.

[11] 4,438,221

[45] * Mar. 20, 1984

[54] POLYURETHANE FOAM-FILLED FOAMS AND METHOD OF PRODUCING SAME

[75] Inventors: Roland N. Fracalossi; Walter V. V. Greenhouse; Michael S. Buchanan, all of Baltimore, Md.

[73] Assignee: Wm. T. Burnett & Co., Inc., Baltimore, Md.

[*] Notice: The portion of the term of this patent subsequent to May 24, 2000 has been disclaimed.

[21] Appl. No.: 497,034

[22] Filed: May 23, 1983

Related U.S. Application Data

[63] Continuation-in-part of Ser. No. 274,726, Jun. 18, 1981, Pat. No. 4,385,131, and Ser. No. 409,030, Aug. 18, 1982.

[51] Int. Cl.³ ............................................. C08G 18/14
[52] U.S. Cl. ....................................... 521/55; 521/99; 521/107; 521/114; 521/122; 521/130; 521/123; 521/137
[58] Field of Search ................ 521/55, 107, 114, 123, 521/137, 99, 130, 122

[56] References Cited

U.S. PATENT DOCUMENTS

| | | | |
|---|---|---|---|
| 3,717,597 | 2/1973 | Hesskamp et al. | 521/128 |
| 3,897,372 | 7/1975 | Kehr et al. | 521/903 |
| 4,054,706 | 10/1977 | Shapiro | 428/213 |
| 4,385,131 | 5/1983 | Fracalossi et al. | 521/55 |

*Primary Examiner*—Maurice J. Welsh
*Attorney, Agent, or Firm*—A. W. Breiner

[57] ABSTRACT

Polyurethane foam products comprising a foam filled with a foam and a large amount of solid material inert to the foam products are described. The foams are prepared by foaming a polyurethane foam-forming diisocyanate and polyol around pre-formed polyurethane foam chips having incorporated therein or therewith solid materials inert to the foam. The inert material can be a fire- or combustion-retardant material; a material such as graphite or the like to render the foam conductive; or a filler material to impart various other characteristics. The polyurethane foam-filled foams can be tailored to have excellent physical characteristics and are particularly suitable for furniture upholstery, cushioning applications including in mattresses, and where special properties are required.

15 Claims, No Drawings

POLYURETHANE FOAM-FILLED FOAMS AND METHOD OF PRODUCING SAME

This application is a continuation-in-part of United States application Ser. No. 274,726 filed June 18, 1981, now U.S. Pat. No. 4,385,131; and application Ser. No. 409,030 filed Aug. 18, 1982.

This invention relates to polyurethane foams. More particularly, this invention relates to polyurethane foam-filled foams containing a relatively large amount of solid material having controlled density, strength, and resiliency characteristics, and tailored to have specific properties such as conductivity, combustion-retardant properties, and the like.

The usage of polyurethane foams for various applications including as a cushioning or padding material has greatly increased in the last ten to twenty years, primarily due to the excellent physical properties of polyurethane foams. Polyurethane foams are available having soft and resilient characteristics rendering them useful, for example, in pillows and blankets. Other polyurethane foams have moderate load-bearing characteristics and as a result are widely used, for example, as seatings in furniture and as fillings for mattresses. Still other polyurethane foam compositions are relatively firm and find application in men's and women's apparel, packaging, thermal and acoustical insulation, and carpet underlay. The versatility and quality of the products that can be manufactured from polyurethane foam are related to the advances that have been made in the chemistry of polyurethane raw materials and in the technology that has evolved in the formulation and processing of materials into satisfactory and needed products.

While the marketplace for polyurethane foams has witnessed innovations and improvements which have led to greatly expanded usage of polyurethane foams, there was also an increasing concern that more needed to be done to reduce the fire potential of polyurethane foams. The concern with respect to fire is partly related to the increased effort which has been expended in recent years to reduce the number of injuries and fatalities to people that are caused by fires whatever the reason and source.

Polyurethane foams are described in our copending applications Ser. Nos. 274,726 filed June 18, 1981, and 409,030 filed Aug. 18, 1982, which have relatively large amounts of fire-retardant or combustion-retardant solids, i.e., from 40 to 200 parts, which have good physical characteristics. These foams were designed to meet particular standards of flame-retardant and smoldering combustion fires. It has now been discovered that the utilization of large amounts of solid material in foams as described in the aforesaid applications can also be utilized to provide improvements in foams for various other applications. For example, the solids can include materials such as graphite, metal filings, or the like to provide conductivity to the foam which will render the foams useful in other applications, such as dielectrics, while still retaining the excellent physical characteristics such as flexibility, resiliency, controlled density, strength, and the like.

Accordingly, it is an object of this invention to produce polyurethane foam products having high loadings of solid materials inert to the foam while still preserving superior physical characteristics that permit the foam to be used in numerous applications without danger of poor performance or rapid attrition.

It is also an object of this invention to produce polyurethane foam products by a method which optimizes the performances of major amounts of solid substances incorporated into the foam.

The aforesaid objects and others are realized by admixing major amounts of a solid substance with shredded or ground polyurethane foam, and the admixture incorporated into a new flexible polyurethane foam comprising the reaction product of a polyisocyanate and a reactive polyol, foamed with added water. The pre-formed foam particles and solid materials are adhesively bonded into dimensionally stable molded configurations. The water to foam the reactive composition can be added to the blended admixture of shredded or ground polyurethane foam, solids, and new flexible polyurethane foam-forming reactant components as steam, passing through the blended composition within a mold, or water can be sprayed onto the blended admixture as the admixture is filled into a mold, and the admixture cured within the mold using dry heat, such as by passing heated dry air through the mold. The polyurethane foam obtained is essentially a foam-filled foam.

Flexible polyurethane foams having a high level of solid material incorporated therein, which are made on conventional foam-forming equipment by combining all the needed components, including major amounts of solid such as flame-retarding substances, at one time so as to make large continuous slabs of foam are known. However, while having generally good foam appearance, such foams exhibit poor strength and durability. This is the result of what may be described as a "dilution" in the polymer network of the normal physical characteristics of an unmodified (or unfilled) polyurethane foam material. The additions of the major amounts of solid substances in this way can reduce, for example, the tear strength of the foam by as much as 70 percent, and the elongation of the foam also by as much as 70 percent. According to the present invention, however, where major amounts of solid substances are admixed with shredded or ground polyurethane foam, and the admixture foamed into dimensionally stable molded configurations, unexpectedly the tear strength of the molded foam is very similar to the tear strength of the original polyurethane foam which is shredded or ground into discrete particles for subsequent bonding into molded configurations. It is believed that the reason for this is that the solid substances are added to cured polyurethane foam chips in a completely separate operation. In this manner, the original foam in the form of chips are essentially "coated" with the solid substances and, hence, retain their physical characteristics. While it can be observed that a portion of the solid materials penetrates into the foam to some extent, the major volume of the foam chips remain in their original condition prior to shredding or grinding. The new foam which acts as an adhesive binder, when added to the foam chips which have firstly been coated with a solid substance, functions to wet and adhere both to the surface of the foam chips and to the particles of solid substances so that upon subsequent addition of the mix to a mold, followed by suitable compression and foaming of the foam-forming reaction mixture with heat and/or steam, a molded configuration is obtained that is permanently formed into a uniquely foamed, stable structure which is essentially a foam-in-foam or a foam-filled foam. In this manner major amounts of solid substances can be incorporated into a polyurethane foam structure so that their presence has the least effect on the foam's inherently good and useful physical properties. This is possible since the solid substances are incorporated in a particular and controlled way.

In practicing the invention, the solid material which can be used in combination with shredded or ground urethane foam includes graphite, carbon particles, or metal filings such as lead filings to impart characteristics such as conductivity or to improve the sound absorption and acoustical properties; various fillers such as polymer powders, asbestos fibers or particles, sawdust, cork, and pigments to impart various useful characteristics; antistatic additives, or materials such as polyvinyl-chloride powders to modify the characteristics of the foam to permit dielectric sealing of the foam to other foam surfaces or to surfaces such as polymer films exemplified by polyvinyl-chloride films; light absorber or light stabilizer powders such as the hindered amines; antioxidants such as the hindered phenols; natural soaps and synthetic detergents including compositions having antibiotic, antiseptic, disinfectant, antiviral, and sterilizing effects; natural or synthetic fibers including cotton fibers, glass fibers, or the like to modify the structural strength of the foam products; beads including glass beads, organic polymer beads such as polystyrene beads, inorganic beads such as alumina bubbles to increase the volume of the foams while controlling lightness in weight; ground rubber or ground elastomeric materials to add enhanced characteristics to the foam, as well as combustion and flame-retardant materials as described in our copending applications Ser. Nos. 274,726 and 409,030. While emphasis is placed on the use of solid materials, liquid materials can be admixed with the solid materials, at times, with advantage. For example, liquid softening or plasticizing agents can be used to enhance the softness and flexibility of the foams. It is possible to use relatively large amounts of solid substances in accordance with the method of this invention without having deleterious effects on the physical characteristics of the obtained structure, placing substantially less restriction on the quantities of the modifying materials which can be used.

The shredded or ground flexible polyurethane foam as well as the new foam reactive material used to bond the particles of foam and solid materials to form a foamed structure suitable for use according to the present invention are derived from reactive hydroxy-terminated polyester or polyether polyols which are reacted with organic polyisocyanates in the presence of suitable catalysts, surfactants, and blowing agents. To obtain a flexible foam, it is necessary to foam with some water. Although most any flexible polyurethane foam which can be shredded into discrete particles or chips can be bonded with the new foam according to this invention, relative ratios of chips to the bonding foam and the amount of solid material in the foam is critical. Thus, in accordance with the present invention, the structure obtained will comprise for each 100 parts of pre-formed discrete polyurethane foam particles from 40 to 200 parts of solid, modifying material, with the chips and modifying material being bonded with from 30 to 75 parts of the "new" foam binder. The "new" foam being the flexible foam formed by reacting the reactive polyol with the polyisocyanate. Because of the manner in which the solid materials are admixed with the pre-formed foam particles and then refoamed, the physical characteristics of the foam can be carefully controlled to provide the physical characteristics essential for meeting various applications.

Examples 1 and 2 will establish the unique characteristics of the foams obtained according to the presently disclosed invention in comparison with prior art foams from the standpoint of physical characteristics. Example 1 demonstrates the improvement obtained in accordance with this invention. Example 2 provides a foam made in accordance with the conventional one-shot method of forming foams for purposes of comparison with Example 1.

EXAMPLE 1

Flexible polyether polyurethane foam made by the one-shot process to produce conventional cushioning material was shredded on commercially available grinding equipment to yield foam chips having particle sizes typically in the range of one-fourth to one-half inch in diameter. The foam did not contain flame-retarding substances. The foam chips were tumbled in a container equipped with rotating mixing paddles and, while tumbling, to each 100 parts by weight of the foam chips were added uniformly the following in parts by weight: 97.1 parts of alumina hydrate; 15.1 parts of decabromodiphenyl oxide; 5.5 parts of antimony trioxide; 3.5 parts of ethylenemaleic anhydride copolymer, EMA 31; and 20.7 parts of Thermolin 101. The substances, having flame-retardant properties, essentially coated the surfaces of the foam chips, with a minor amount of material penetrating to varying degrees below the surface area of the chips. The penetration of the solids into the chips or ground foam will vary depending upon the particle size of the solid materials. It has been found that if the solid materials have a particle size in the 1 micron range, the penetration will be substantially through the chip; whereas if the particle size of the solid materials is in the range of 30 microns, the chips will be largely coated on the outside with the solid material. It has been found that if the particle size is in the range of 15 microns the penetration is highly advantageous. While still tumbling, 40.5 parts by weight of a liquid polyurethane foam-forming reaction product was added in a uniform manner into the mixture of chips and modifying substances; and the final blend was further tumbled until all liquid binder was well distributed and fully absorbed by the modifying substances and by the pre-formed foam particles. The polyurethane foam binder utilized is the reaction product of a polyether polyol having a molecular weight in the range of about 3000 to 6500 with toluene diisocyanate in the presence of a catalyst, i.e., stannous octoate; a surfactant component, i.e., organosilicone compounds; a tertiary amine catalyst, i.e., N-ethyl morpholine; and sufficient solvent to provide a sprayable mixture. Water as the foaming agent essential to obtain the flexible new foam binder is provided later in the process as will be apparent. The blended material was then placed into a mold and compressed so as to obtain a density of 5.6 pounds per cubic foot. The blend was exposed to live steam for five minutes at low pressure (maximum 10 psig) in order to foam and bond the blend, after which the compressed pad of polyurethane foam was dried in a hot air oven. The molded polyurethane foam pad had good strength and resiliency. The particles of modifying substances were tightly bound to the foam chips on visual inspection. Verification of the structural integrity of the foam was established after flexing the pad in a compression apparatus for 250,000 cycles.

The foam pad was also tested for physical properties in accordance with ASTM test method D-1564. The tensile strength was 11 psi and the tear resistance 2.6 pounds. The pad gave a 25 percent ILD of 40.5 pounds, and a 65 percent ILD of 154 pounds. The ratio of the load at 65 percent divided by the load at 25 percent—recognized in the furniture, mattress, and automotive seating industry as a support factor which is desired to be at least 2.0 and preferably greater than 2.0—is calculated to be 3.8 which is a significant improvement and establishes the usefulness of the product in such applications.

EXAMPLE 2

In this example a flexible polyurethane foam is made by the one-shot process in which the same modifying substances utilized in Example 1 are incorporated into the foam-forming composition as shown below such that, based on 93.3 parts of polyether glycol used to make the foam, the equivalent amounts of modifying substances are employed in this Example 2 as are used in Example 1. The purpose of this example is to make a comparison between the effective use of modifying substances when made in accordance with the method of Example 1 and the method of Example 2.

The 100 parts by weight of foam chips used in Example 1 are made from approximately 65.9 parts by weight of the polyether polyol and 34.1 parts by weight of toluene diisocyanate. The liquid polyurethane foam binder of Example 1, which is 40.5 parts by weight, is made from 27.4 parts by weight of polyether polyol and 13.1 parts by weight of toluene diisocyanate. Accordingly, the combined total of polyether polyol used in Example 1 is 93.3 parts by weight, and the toluene diisocyanate is 47.2 parts by weight. The foam-forming composition for this Example 2 is as follows:

93.3 parts polyether polyol (Pluracol 774 from BASF Wyandotte Corp.)
47.2 parts toluene diisocyanate
97.1 parts alumina hydrate
15.1 parts decabromodiphenyl oxide
5.5 parts antimony trioxide
3.5 parts ethylene-maleic anhydride copolymer, EMA 31
20.7 parts Thermolin 101

The alumina hydrate, decabromodiphenyl oxide, antimony trioxide, ethylene-maleic anhydride copolymer, and Thermolin 101 are added to 93.3 parts of Pluracol 774 and mixed thoroughly in a Hobart mixer until a smooth, creamy, flowable consistency is obtained. The viscosity of the blend was tested with a Brookfield Viscometer and indicated approximately 10,000 centipoises. This blend was transferred through a Moyno pump to the mixing head of a conventional polyurethane foam-forming apparatus, together with 47.2 parts toluene diisocyanate and sufficient water, catalyst, and surfactant to produce a large slab of flexible polyurethane foam. The slab was allowed to reach its optimum exotherm for curing, and further permitted to set several days before any testing was done.

The foam was tested in accordance with ASTM D-1564, and had the following physical properties: tensile strength of 9.0 psi and tear resistance of 1.15 pounds. The pad gave a 25 percent ILD of 38 pounds, and a 65 percent ILD of 76 pounds, providing a ratio of the load at 65 percent divided by the load at 25 percent of 2.0.

As is apparent, the physical characteristics of the foam made according to this invention as shown in Example 1 were greatly superior to the physical characteristics of the foam made according to the prior art as shown in Example 2.

In Example 1, the modifying substances can be replaced with other solid modifying substances including graphite, carbon particles, metal filings such as lead filings, various fillers including polymer powders, asbestos, sawdust, cork, and pigments; antioxidants such as the hindered phenols; natural soaps and synthetic detergents including compositions having antibiotic, antiseptic, disinfectant, antiviral, and sterilizing effects; antioxidants such as the hindered phenols, light absorbers or stabilizers such as the hindered amines, powders such as polyvinylchloride powders to impart properties to permit dielectric sealing of the foam to the other foams or to other surfaces; natural and synthetic fibers such as cotton fibers, glass fibers, organic and inorganic beads including beads of polystyrene and alumina bubbles. Liquid-modifying substances can be included such as the softening and plasticizing agents. The particular materials incorporated are not critical other than to the extent that they must be inert to the foam and foam-forming reactants, liquid materials can also be used which are inert to the foam and foam-filling reactants. It is critical, however, that the solid material be in the range of from about 40 to 200 parts per 100 parts foam chips, and that the chips and solid materials be foamed with from about 30 to 75 parts of new foam-forming reactants.

As will be apparent to one skilled in the art, various modifications can be made within the scope of the aforesaid description. Such modifications being within the ability of one skilled in the art form a part of the present invention and are embraced by the appended claims.

It is claimed:

1. A foam-filled polyurethane foam structure obtained through the steps of
    (a) obtaining particles of flexible polyurethane foam;
    (b) admixing said particles of (a) with a solid material;
    (c) uniformly applying to said admixture of (b) a liquid flexible polyurethane foam-forming material containing a reactive polyol and a polyisocyanate;
    (d) foaming said foam-forming material of (c) with water to provide a flexible foam having bonded therein said polyurethane foam particles and said solid material;
the relative amounts of materials in said foam structure being such that for each 100 parts by weight of polyurethane foam particles, about 40 to 200 parts by weight of solid material and about 30 to 75 parts by weight of foam-forming material are used, said solid material being inert to said foam and foam-forming material.

2. The structure of claim 1 wherein said particles of polyurethane foam are obtained as the reaction product of a polyether polyol and a polyisocyanate, foamed with water.

3. The structure of claim 2 wherein said liquid flexible polyurethane foam-forming material contains a reactive polyether polyol.

4. The structure of claim 1 wherein said particles of polyurethane foam are obtained as the reaction product of polyester resin and a polyisocyanate, foamed with water.

5. The structure of claim 4 wherein said liquid flexible polyurethane foam-forming material contains a reactive polyester resin.

6. The method of forming a foam-filled polyurethane foam structure comprising the steps of (a) obtaining particles of flexible polyurethane foam;
(b) admixing said particles of (a) with a solid material;
(c) uniformly applying to said admixture of (b) a liquid flexible polyurethene foam-forming material containing a reactive polyol and a polyisocyanate;
(d) foaming said foam-forming material of (c) with water to provide a flexible foam having bonded therein said polyurethane foam particles and said solid material;

wherein the relative amounts of materials in said foam structure are such that for each 100 parts by weight of polyurethane foam particles, about 40 to 200 parts by weight of solid material and about 30 to 75 parts by weight of foam-forming material are used, said solid material being inert to said foam and foam-forming material.

7. The method of claim 6 wherein said structure if formed by placing the reactive mixture obtained from steps (a), (b), and (c) in a mold and compressing to the desired density, and thereafter exposing said mixture to live steam at low pressure to foam said foam-forming material.

8. The structure of claim 1 wherein said solid material includes carbon particles.

9. The structure of claim 1 wherein said solid material includes polyvinylchloride powders.

10. The structure of claim 1 wherein said solid material includes a detergent composition.

11. The structure of claim 1 wherein said solid material includes a natural soap.

12. The structure of claim 1 wherein said solid material includes synthetic fibers.

13. The structure of claim 1 wherein said solid material includes glass beads.

14. The structure of claim 1 wherein said solid material includes organic polymer beads.

15. The structure of claim 1 wherein said solid material includes ground elastomeric material.

* * * * *